May 22, 1962     A. H. ROSENTHAL ET AL     3,035,491
ULTRASONIC LIGHT MODULATOR CELL ASSEMBLY
Filed Aug. 2, 1957
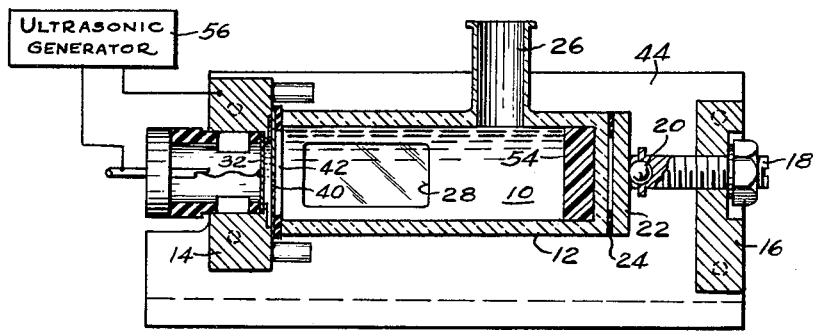
Fig. 1
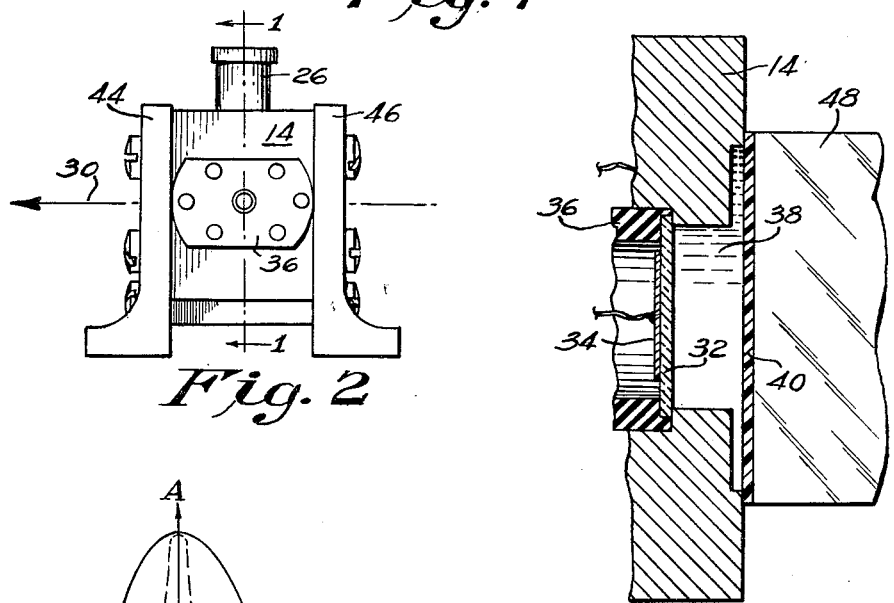
Fig. 2
Fig. 3
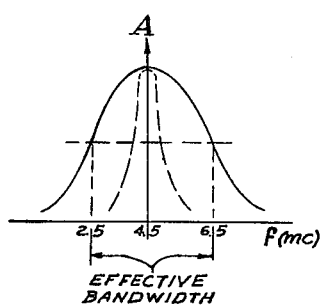
Fig. 4
A. H. ROSENTHAL &
S. TINTO,
INVENTORS,
BY Homer R. Montague
ATTORNEY 3,035,491
ULTRASONIC LIGHT MODULATOR
CELL ASSEMBLY
Adolph H. Rosenthal, Forest Hills, and Sophie Tinto, New York, N.Y., assignors to Fairchild Camera and Instrument Corporation, a corporation of Delaware
Filed Aug. 2, 1957, Ser. No. 675,982
6 Claims. (Cl. 88—61)

This invention pertains to ultrasonic cells, and more particularly to improvements in the arrangements wherein an ultrasonic transducer is mechanically coupled to an optical element for the purpose of inducing compressional waves in the latter which can be used for light modulation.

The coupling of mechanical wave energy into an optical body, which may be, for example, a light diffracting liquid or solid, becomes required in various applications of ultrasonics. Without limiting the present invention to such application, it may be stated that such devices find wide use as light modulators or light valves, especially in connection with optical display systems for radar or similar purposes. A fundamental problem in such applications is that of obtaining useful values of output (for example, in terms of modulation percentage of a light beam) over a wide range of driving frequency variations. For example, the useful frequency band obtained with a known ultrasonic cell configuration, consisting of a crystal of X-cut quartz or Z-cut tourmaline exciting directly a transparent liquid in a suitable container, is about 1.5 megacycles per second at a center frequency of 15 megacycles. This corresponds to a Q of about 10, and while this value is much lower than the Q of an unloaded quartz crystal, which might be of the order of 10,000, it would be desirable to obtain even lower values of Q, for example corresponding to a frequency bandwidth of about 40 megacycles, at a center frequency of about 50 megacycles.

It is accordingly a principal object of the present invention to provide an ultrasonic cell assembly of good efficiency capable of providing greatly increased useful bandwidth of the driving frequency, along with collateral advantages such as the reduction of effects due to reflections at the crystal-liquid interface in the cell, protection of the driven device from damage (in the case of solid optical driven elements especially), and good operation in all positional orientations in the case of liquid optical driven elements.

In general, the above results can be accomplished by utilizing a layer or section of mercury between the driving crystal and the driven device, this layer being bounded at one of its faces by the driving crystal or other solid transducer and on the other face by a membrane of a suitable plastic sheet material. The assembly is so constructed that the mercury layer is maintained in position regardless of the orientation or mounting of the assembly, and is adapted for utilization of either solid or liquid driven elements.

It is recognized that arrangements are well known for coupling ultrasonic energy into solids for the purpose of inspecting or testing the latter for defects such as voids, inclusions and other inhomogeneities. In such cases, only sufficient energy is required to obtain measurable transmitted (or reflected) signals, and no question of damage to the article normally arises. The use of liquid couplants between the vibrator and the article or workpiece is also known in those applications, to improve the mechanical impedance match and the energy transfer.

The present invention is distinguished from the foregoing in that it deals with the coupling of ultrasonic energy into an optical body for the purpose of making a transient change in the nature of the latter to produce some phenomenon which is useful outside the apparatus itself. An excellent example is the ultrasonic optical cell as described above; however, the invention is not limited to such applications only, but is useful wherever it is necessary to provide a functionally unitary combination of ultrasonic transducer and an element driven thereby, for good bandwidth response at any frequencies.

The invention will best be understood by referring to the following detailed specification of a preferred example of the improved construction, the same being read in connection with the appended drawings, in which:

FIG. 1 is a longitudinal sectional view of a preferred form of the invention, using a liquid optical driven element, the section being taken on line 1—1 of FIG. 2.

FIG. 2 is an end view of the same embodiment.

FIG. 3 is an enlarged view of the arrangement for maintaining the coupling liquid or mercury in its desired position, and differing from FIG. 1 only in applying the invention to a solid optical driven element.

FIG. 4 is a graphical representation of the improvement in the bandwidth obtainable by use of the invention.

Referring first to FIG. 1, the application of the invention to an ultrasonic cell using a liquid optical element is shown. The optical liquid 10 is contained in a transparent, preferably glass cell 12 which has its left end open for communication with the driving arrangement to be described. The cell 12 is clamped between end plates 14 and 16 as by a screw 18 threaded in plate 16 and having a swivel ball connection 20 with a pressure plate 22 clamping the right end of the cell through a resilient washer 24. A duct 26 permits insertion and removal of the active cell liquid, for example water or a water-alcohol mixture, and this duct is closed by a rubber expansion cap (not shown). A window area is indicated at 28, through which a beam of collimated light (indicated by arrow 30 in FIG. 2) may traverse the optical cell.

The driving crystal is indicated at 32, and may for example be a Z-cut tourmaline crystal 0.003" thick. As more clearly shown to larger scale in FIG. 3, the left face of this crystal has its central area silver plated as at 34 to provide one electrode, with a non-conducting ring of crystal face surrounding the electrode. Alternatively, the cylinder 36 holding the crystal in place within end plate 14 may be of insulating material, as shown. End plate 14 is bored to provide a receptacle for the mercury body 38, and a sheet of butyl acetate plastic 40, 0.002" thick, closes the receptacle. The mercury layer 38 is about 0.040 to 0.045" thick in the embodiments shown, having a center frequency of about 45 megacycles, and exhibiting a total useful bandwidth of about 40 megacycles; i.e., 20 megacycles up and down from the center frequency. The example described will of course be varied in its dimensions where other center frequencies and bandwidths are desired.

In FIG. 1, employing a liquid optical body, the open end of glass cell 12 is secured against the face of plastic membrane 40 through the intermediary of a resilient neoprene rubber washer 42 to ensure liquid tightness. The end plates 14 and 16 are carried by side plates 44 and 46 (see FIG. 2) to provide a rugged self-contained unit operable in any position. The side plates are apertured to correspond to the window area 28.

In FIG. 3, the liquid optical cell has been replaced by a transparent solid piece, for example glass, designated 48, which may be held in place by the same clamp arrangement as shown in FIG. 1, or equivalent arrangements.

FIG. 4 indicates diagrammatically and schematically the order of improvement of the effective bandwidth, the solid line curve indicating for the examples shown a bandwidth measured at the half-power points of about 40 megacycles, as compared with only a few megacycles in the case of the ultrasonic cell assembly without the intermediate mercury layer, indicated by curve 52.

Where reflection of ultrasonic energy backward through the optical body might cause objectionable effects, an absorbing layer 54 of neoprene or similar material may be provided at the end of the optical body remote from the driving crystal, to prevent the formation of standing waves at any frequency. As indicated in FIG. 1, the energy from the generator 56 is conveyed to the crystal 32 at one face via the plated area described above, and at the other face through the metallic end plate 14 and the mercury layer 38.

The layer of mercury 38 constitutes a liquid impedance-matching section between the driving crystal and the driven body, and its inherent mass provides relatively strong mechanical loading of the driving crystal. It is believed that the plastic membrane 40 also acts to a degree as an impedance matching section, insofar as its acoustic impedance lies between that of the mercury and that of the driven body. It also seems to insure a more uniform distribution of the ultrasonic beam. Moreover, the membrane additionally prevents flow of the mercury into the cell liquid, which would occur especially in the horizontal arrangement of FIG. 1, and it acts also to prevent emulsification of the mercury into the cell liquid under the well-known emulsifying action of the ultrasonic waves.

The foregoing examples of constructions in accordance with the principles of the invention have been given in considerable detail in order that those skilled in the art may readily practice the invention without recourse to experimentation. However, those details are not intended to be restrictive, because it is clear that the novel principles may equally well be carried out with specifically different component elements. Thus, the driving transducer need not be piezoelectric, but may be of magnetostrictive, electromagnetic or any other type capable of imparting the necessary energy to the driven body, at the desired wave frequency. Further, instead of using a single driving transducer of one single frequency, a multiplicity of transducers, each with a different frequency, may be used. Alternatively a wedge shaped transducer covering a band of frequencies may be employed.

The liquid couplant may be other than mercury; for example, liquid metallic alloys such as amalgams or even other fluids suited to the requirements of good impedance match, mass loading and efficient energy transfer. Membrane 40 may be of any desired material capable of containing the couplant without mutual attack, solution action, diffusion or leakage, but of course it should have good resistance to fatigue and should not act, as by excessive rigidity, to impede the desired energy transfer. Suitable membrane materials may include heavy cellophane (regenerated cellulose), natural and synthetic rubbers and similar elastomers, polyamide plastics ("nylon"), tetrafluorethylene synthetics ("Teflon"), and such other well known membrane materials as ethyl cellulose, "saran" and others of suitable properties as defined above, including sheets of suitable metals. Those membranes may be provided with a suitably roughened, shaped or corrugated surface to improve the uniformity of the energy transfer across the whole crystal surface.

The driven element, shown in the drawings as an optical element or material, may be any object producing a useful external effect which the cell is intended to provide. Thus, it need not be an isotropic solid, and optically anisotropic crystal materials, with or without polarizers, may be employed for light modulation, controlled phase retardation and like effects. For other purposes, as mechanical or electrical output effects such as delay lines, the driven element may be isotropic or even amorphous or metallic. The essential novelty of the invention is related to the combination of driver and driven element as a self-contained unit, for maximum energy utilization, wide bandwidth, efficiency, long life and dependability under varying orientations and environmental hazards. As such, the invention is obviously not restricted to any particular output device, so long as such device otherwise corresponds to the conditions of the problem.

Modifications such as those mentioned, and others that will occur to those skilled in the art, are not excluded from the true spirit and meaning of the invention except as may be required by the scope of the appended claims.

What is claimed is:

1. In an ultrasonic light modulator cell assembly, a driving transducer, a driven element of transparent material having an energy-receiving face, means defining a coupling chamber between said transducer and said element, and a body of compressional wave-transmitting metallic liquid filling said chamber and in wave-transmitting relation to said transducer and said face.

2. An ultrasonic cell assembly in accordance with claim 1, wherein said chamber defining means includes a wave-transmitting solid non-metallic membrane separating said coupling liquid and said face.

3. An ultrasonic light modulator cell responsive to a relatively broad range of input frequencies, comprising a body of optically transparent material defining an optical axis through said cell, an ultrasonic drive element having a compressional wave propagating direction substantially perpendicular to said axis, a liquid of high density mechanically coupling facing surfaces of said body and said element, and means for maintaining the interface between said body and said liquid substantially parallel to said axis in all positions of orientation of said cell.

4. An ultrasonic light modulator cell in accordance with claim 3, wherein said interface-maintaining means includes a flexible vibration-transmitting non-metallic membrane disposed between said liquid and the adjacent surface of said body.

5. An ultrasonic light modulator cell responsive to a broad range of input frequencies, comprising a body of optically transparent material defining an optical axis through said cell, an ultrasonic drive element having a plurality of faces and having a compressional wave propagating direction substantially perpendicular to said axis, means between said body of optically transparent material and said ultrasonic drive element for matching the mechanical impedance of said drive element with said body of optically transparent material, said impedance-matching means including a shallow confined body of high density liquid contacting a major portion of one face of said ultrasonic drive element, said shallow confined liquid body being separated from said body of optically transparent material by a flexible, non-metallic vibration transmitting membrane for matching the impedance of said two adjacent bodies, and means for maintaining said shallow confined body of high density liquid in contact with said drive element face and said membrane in all positions of orientation of said cell.

6. The apparatus as set forth in claim 5, in which said shallow confined body of high density liquid consists of metallic mercury.

References Cited in the file of this patent

UNITED STATES PATENTS

| | | |
|---|---|---|
| 2,155,659 | Jeffree | Apr. 25, 1939 |
| 2,449,166 | Hershberger | Sept. 14, 1948 |
| 2,498,990 | Fryklund | Feb. 28, 1950 |
| 2,507,770 | Claassen | May 16, 1950 |
| 2,620,894 | Peterson et al. | Dec. 9, 1952 |
| 2,650,991 | Ketchledge | Sept. 1, 1953 |
| 2,702,692 | Kessler | Feb. 22, 1955 |
| 2,779,880 | Malherbe | Jan. 29, 1957 |

FOREIGN PATENTS

| | | |
|---|---|---|
| 492,469 | Great Britain | Sept. 21, 1938 |